Figure 1:
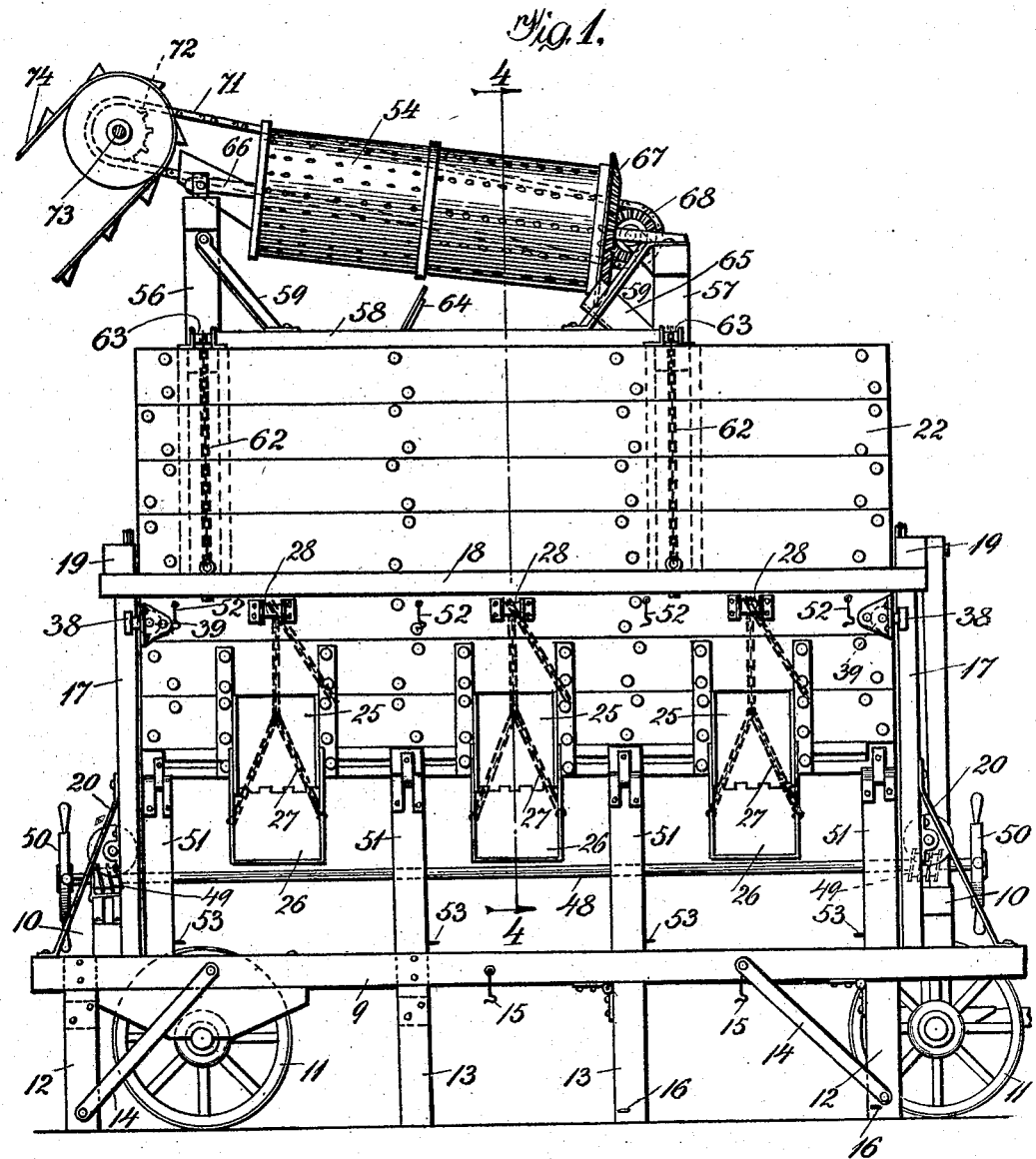

S. F. WELCH.
PORTABLE BIN FOR HANDLING CRUSHED STONE, &c.
APPLICATION FILED OCT. 28, 1907.

932,598.

Patented Aug. 31, 1909.

5 SHEETS—SHEET 1.

S. F. WELCH.
PORTABLE BIN FOR HANDLING CRUSHED STONE, &c.
APPLICATION FILED OCT. 28, 1907.

932,598.

Patented Aug. 31, 1909.
5 SHEETS—SHEET 2.

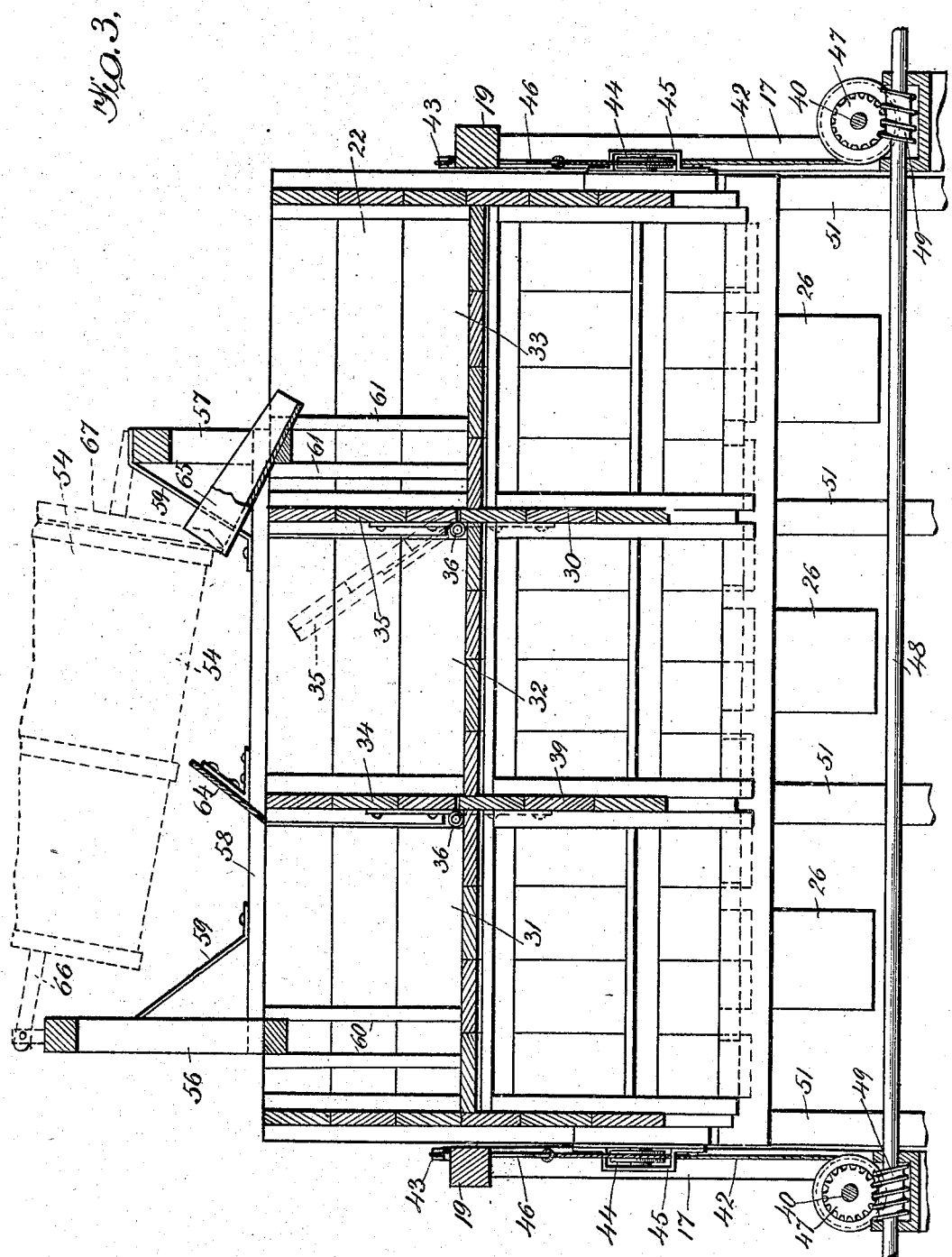

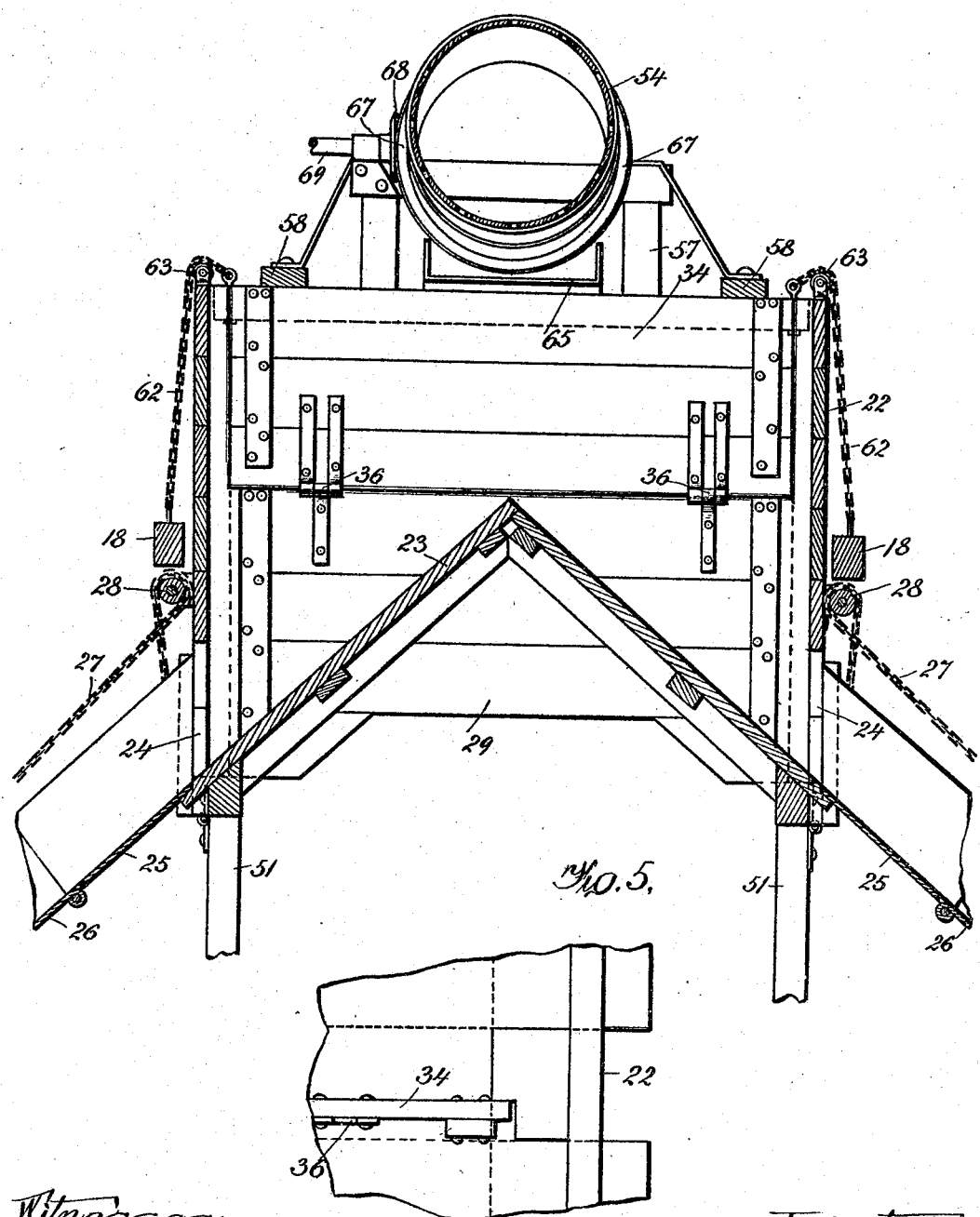

S. F. WELCH.
PORTABLE BIN FOR HANDLING CRUSHED STONE, &c.
APPLICATION FILED OCT. 28, 1907.

932,598.

Patented Aug. 31, 1909.
5 SHEETS—SHEET 5.

UNITED STATES PATENT OFFICE.

SAMUEL FRANK WELCH, OF AURORA, ILLINOIS, ASSIGNOR TO WESTERN WHEELED SCRAPER COMPANY, OF AURORA, ILLINOIS, A CORPORATION OF ILLINOIS.

PORTABLE BIN FOR HANDLING CRUSHED STONE, &c.

932,598.       Specification of Letters Patent.    Patented Aug. 31, 1909.

Application filed October 28, 1907. Serial No. 399,464.

*To all whom it may concern:*

Be it known that I, SAMUEL FRANK WELCH, a citizen of the United States, residing at Aurora, in the county of Kane and State of Illinois, have invented certain new and useful Improvements in Portable Bins for Handling Crushed Stone, &c., of which the following is a specification, reference being had to the accompanying drawings.

My invention relates to the handling of crushed stone and analogous materials, and has for its object to provide new and improved portable apparatus by which the stone may be stored, sorted or graded into different sizes, and after grading may be conveniently discharged into wagons or other conveyances placed to receive it; also to provide such an apparatus which will be telescopic in construction and operation, so that the several parts will occupy a comparatively small space when arranged for transportation, but which may be expanded to properly elevate the materials and deliver them at the proper height for convenient discharge into wagons, etc. I accomplish this object as illustrated in the drawings and as hereinafter described.

That which I believe to be new is set forth in the claims.

Figure 2:
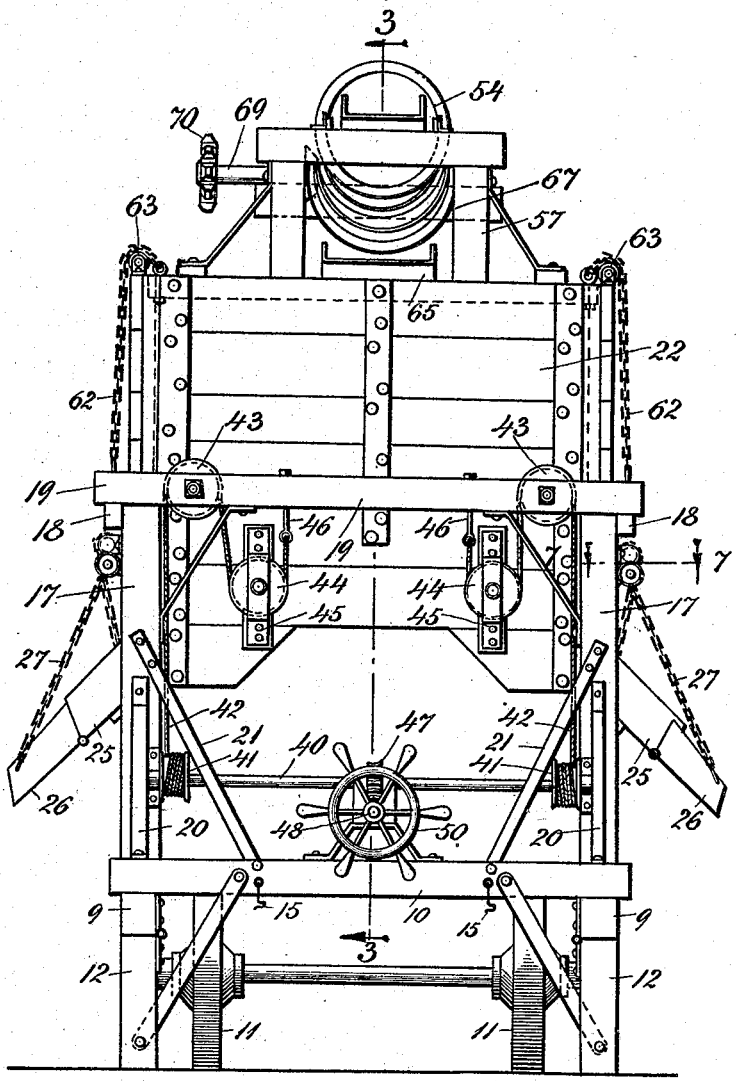
Figure 7:
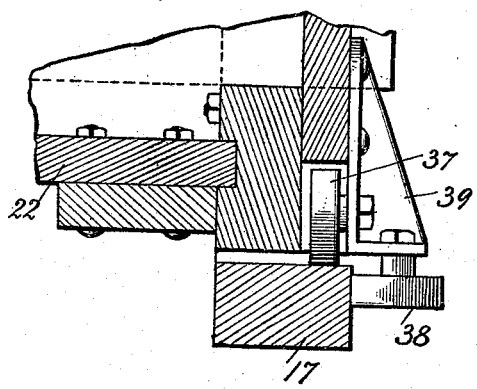
Figure 8:
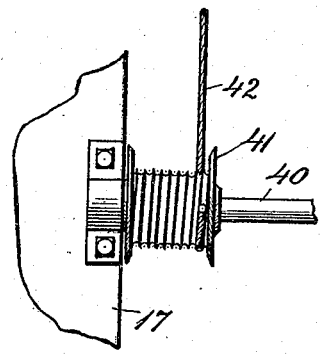
Figure 6:
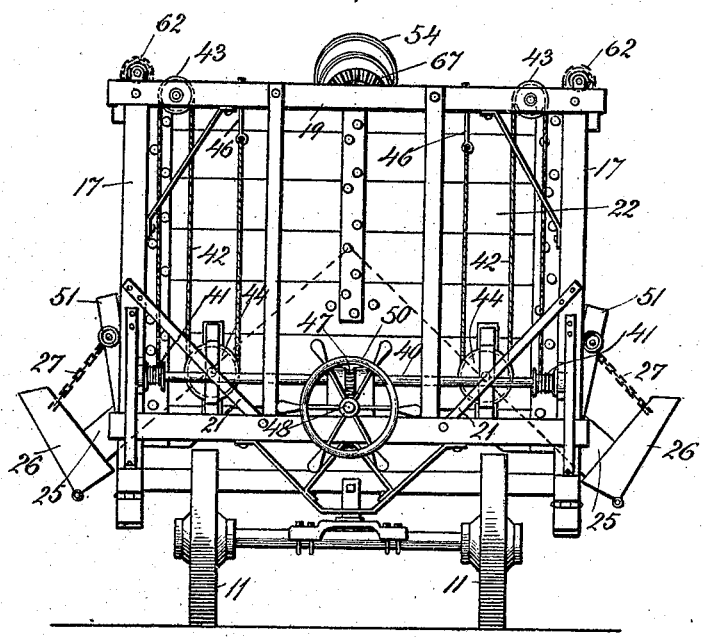

In the accompanying drawings,—Figure 1 is a side elevation of my improved bin, showing the parts in operative position; Fig. 2 is an end view of the same; Fig. 3 is a longitudinal sectional view on line 3—3 of Fig. 2, showing the upper part of the apparatus; Fig. 4 is a detail, being an enlarged cross-section of the upper part of the apparatus on line 4—4 of Fig. 1; Fig. 5 is an enlarged detail, being a plan view of the upper part of the bin, showing one end of one of the cross-partitions; Fig. 6 is an end view of the apparatus, showing the contracted or inoperative position of the parts; Fig. 7 is an enlarged detail, being a partial horizontal section on line 7—7 of Fig. 2, illustrating the guide rollers which guide the upper portion of the apparatus as it moves up and down on the main frame which supports it; and Fig. 8 is a detail, showing one of the drums by which the bin proper is raised and lowered.

In a general way it may be explained that my improved bin comprises a main frame supported on wheels after the manner of a wagon or truck, said frame being of suitable construction to adequately support and guide the bin proper which is mounted to slide vertically in said frame, being guided thereby by means of suitable rollers which run on the corner posts of the main frame. Suitable drums and cables are provided by which the operator may raise and lower the bin at pleasure. The bin is provided with chutes at its sides and with an inclined floor in the form of an inverted V arranged to direct the material falling into the bin into the chutes. The chutes are so placed and the frame and the various parts of the apparatus so proportioned that when the bin is in its elevated position the several chutes are high enough to discharge into wagons, or other conveyances, placed to receive the materials delivered. In the apparatus illustrated three chutes are provided at each side and the bin is divided transversely into three compartments by two cross-partitions. Telescopically arranged at the upper portion of the bin is a rotary screen, which extends longitudinally of the bin and is arranged to discharge into the several compartments of the bin, the graded materials falling into the proper compartments and thence passing to the appropriate chute. Thus the largest materials are deliveerd from the first chutes on either side, the intermediate grade from the intermediate chutes, and the finest materials from the third chutes. The materials are elevated to the screen by an endless conveyer, or other suitable means. When the apparatus is in use suitable legs or posts are provided which support the main frame from the ground, relieving the wheels from the weight of the apparatus; and in like manner supports are provided which rest on the main frame and carry the weight of the bin, thus relieving the hoisting mechanism.

Referring now to the drawings for a more detailed description of my improved invention as therein illustrated; 9—10 indicate side and end beams, respectively, which together make up the base of the main frame, as shown in Figs. 1 and 2, the base being rectangular in form.

11 indicates the wheels, which are connected to the main frame in any suitable way.

12 indicates end posts or legs and 13 intermediate posts or legs, which are hinged to the base so as to be capable of being turned down to a vertical position under the side and end beams 9 and 10, respectively, as also shown in Figs. 1 and 2,—the arrangement being such that when desired said legs may be turned down to support the apparatus, thus relieving the wheels. The end legs are preferably braced by detachable braces 14.

15 indicates hooks, which are provided for holding the several legs up out of operative position when not in use, said hooks being arranged to engage eyes 16, or other equivalent devices, carried by the legs.

17 indicates corner posts arranged at the corners of the main frame, said posts rising from the side and end members 9—10, as shown in Figs. 1 and 2. They are connected at their upper ends by side bars 18 and end bars 19, as also shown in Figs. 1 and 2. These several parts together form an open box-like frame in which the bin proper moves telescopically, as will be hereinafter described.

20—21 indicate braces for the corner posts.

22 indicates a bin in the form of a box, which is adapted to fit into the frame above described, and which for convenience will be termed the main frame of the apparatus. The bottom 23 of the bin is made in the shape of an inverted V so that the material therein contained is directed to the side edges of the bin for discharge through side openings 24 at the opposite sides thereof, as shown in Fig. 4. In the construction shown three openings are provided at each side of the bin, one for each compartment, in which the bin is divided by transverse partitions, as will hereinafter appear.

25 indicates chutes provided outside of the bin opposite each opening 24 for guiding the discharged material. Each of said chutes is provided with a hinged extension 26, which is adapted to be swung down into operative position or folded up out of operative position, when it forms a gate to close the lower end of the chute to which it is attached, as shown in Fig. 6. The extensions 26 are raised and lowered by means of chains 27 which pass over sheaves 28 suitably arranged at the sides of the bin, as shown in Fig. 4. The free ends of the chains 27 may be secured in any suitable way.

29—30 indicate cross-partitions, which extend transversely of the bin at suitable intervals dividing it into three compartments 31—32—33, respectively. As shown in Figs. 3 and 4, said partitions extend from one side of the bin to the other, passing through the apex of the bottom 23. At their upper edges the partitions 29—30 are provided with hinged extensions 34—35, respectively, which, when in their vertical or operative position, extend to the upper ends of the bin. As also shown in Figs. 3 and 4, the extensions 34—35 are provided with hinges 36 at their lower margins so that they may fold down to a horizontal or substantially horizontal position, thus providing a clear space for the admission of the screen when it is lowered into the upper portion of the bin, as will be hereinafter described.

As has been suggested, the bin 22 is fitted to move telescopically in the main frame. In order to guide it when being raised and lowered, and also to hold it steady, it is provided at each corner with rollers 37—38 arranged at right angles so as to bear against adjacent faces of the corner posts 17, as shown in Fig. 7. Said rollers are carried by suitable brackets 39, as also shown in said figure.

The bin 22 is raised and lowered by means of hoisting mechanism, best shown in Figs. 2, 3 and 8. As shown in Figs. 2 and 3, a shaft 40 is arranged transversely at each end of the main frame, being journaled in suitable bearings in the corner posts 17. At each end said shafts 40 are provided with drums 41, around which are wound cables 42 which pass over sheaves 43 carried by the cross-bars 19 and under pulleys 44 secured in brackets 45 at the ends of the bin near the lower portion thereof, their ends being secured to the cross-bars 19, preferably by means of bolts 46, best shown in Fig. 2. Thus, when the cables 42 are wound upon the drums 41, it will be apparent that the bin will be lifted. The shafts 40 at the two ends of the main frame are rotated in unison by means of worm-gears 47 mounted on said shafts and connected by a shaft 48 carrying at its ends right and left hand worms 49, as shown in Fig. 3. Hand-wheels 50 are provided at the ends of the shaft 48 so that said shaft may be rotated from either or both ends of the apparatus. The shaft 48 is, of course, supported by the main frame in any suitable way. By this construction by rotating the hand-wheels 50 the bin may be raised to the position shown in Figs. 2 and 3, where it projects to a considerable extent above the upper portion of the main frame; or it may be lowered so as to lie entirely within the main frame, as shown in Fig. 6. The object of this construction is to provide for raising the bin to such a point that the chutes 25 may be raised high enough to discharge directly into wagons, or other vehicles, provided to receive the materials discharged, and when not in use may be lowered so as not to interfere with the transportation of the apparatus. When the bin is in its elevated position, the hoisting mechanism is relieved from the weight of the bin and its contents by providing a series of legs 51, preferably four, at each side, which are hinged at their upper ends to the lower side edges of the bin and are adapted to be swung down so as to rest upon the side bars 9 of the main frame. When not in use they may be folded up against the sides of the bin and there secured by hooks 52 adapted to engage eyes 53 with which the legs are provided, as shown in Fig. 1. The several legs 51 are best arranged as nearly as may be so as to register with the legs 12—13, so that the weight is sustained more directly by the legs 12—13 instead of by the side bars 9 of the main frame. In practice the legs 12—13 are swung down into operative position before the bin is elevated and before it is loaded. If necessary, the main frame may be lifted by means of lifting jacks, or other mechanism, to permit the legs 12—13 to be turned down to a vertical position, or the bin 22 may be raised by the hoisting mechanism high enough to permit the legs 51 to be folded down into position to support it.

54 indicates a rotary screen, which is mounted in an inclined position in a frame which is carried by the bin 22, as best shown in Fig. 3. Said frame is composed of end members 56—57 connected by side bars 58, braces 59 being provided for bracing the side and end members of said frame. The end members 56—57 are arranged to slide in guideways formed by vertical guide strips 60—61 secured at the inner sides of the bin near its ends, as shown in Fig. 3 and indicated in dotted lines in Fig. 1. Thus, when the extensions 34—35 are folded down, the screen frame may be lowered so as to lie within the upper portion of the bin, carrying with it the screen 54. The screen frame is automatically raised and lowered in unison with the raising and lowering of the bin by means of chains, or other flexible connections, 62, two of which are provided at each side of the bin near the ends of the screen frame, said chains being connected at one end with the side bars 18 and at the other end with the sides of the screen frame, after passing over sheaves 63 mounted on the upper side edges of the bin, as shown in Figs. 1 and 2. Obviously, when the bin descends this arrangement permits the screen frame to descend into the bin to an equal extent, and in like manner when the bin is raised the screen frame is lifted accordingly.

As best shown in Fig. 1, the screen 54 is perforated, the larger perforations being in the lower half thereof, so that the finer materials are delivered from the upper portion of the screen. The largest material passes out at the end of the screen, while the intermediate grade is discharged from the perforations in the lower half. The length of the screen, in the construction shown, is substantially two-thirds that of the bin, and the arrangement is such that the material discharged from the end of the screen is delivered to the last compartment of the bin, while the intermediate grade is delivered to the intermediate compartment. For this purpose the screen frame is provided with a deflector 64 which extends transversely thereof in position to direct the material passing out of the upper portion of the screen into the first compartment of the bin; also a chute 65 is provided at the lower end of the screen which directs the material passing out of the lower end thereof into the third compartment of the bin. Said chute is also secured to the screen frame, and together with the deflector 64 rises and falls with the screen frame so that it is always in proper operative position.

The screen 54 is adapted to rotate, being carried on a longitudinally-extending shaft 66, the ends of which are journaled in the end members 56—57 of the screen frame. At the lower end of the screen 64 is a beveled gear 67 which meshes with a pinion 68 mounted on a shaft 69 which carries a sprocket-wheel 70, as shown in Figs. 1 and 2. Said sprocket-wheel is connected by a link belt 71 and a sprocket-wheel 72 mounted on a suitable shaft 73 supported in any convenient way adjacent to the screen frame. Said shaft 73 supports an endless conveyer 74, which is driven in any suitable manner. The power which operates the conveyer 74, in the construction shown, therefore, serves to rotate the screen, but it will be understood that my invention is not restricted to supplying or driving the screen in the manner illustrated, as any other suitable mechanism may be employed for the purpose. The tension of the cables 42 may be regulated by adjusting the tension of the screws 46. This will be accomplished by adjusting the position of the nuts on said bolts.

That which I claim as my invention, and desire to secure by Letters Patent, is,—

1. A loading apparatus, comprising a wheeled frame, a bin mounted on said frame, means for raising and lowering the bin upon said frame, and upper and lower supports in the same vertical plane for providing a vertical support for the bin from the ground when said bin is in its elevated position.

2. A loading apparatus, comprising a wheeled frame, a bin mounted on said frame, means for raising and lowering the bin upon said frame, legs adapted to bear on said frame for supporting the bin when in its elevated position, and legs under said frame and adapted to bear on the ground substantially in line with said first-mentioned legs for supporting the frame while in operation.

3. A loading apparatus, comprising a main frame, a bin supported by said frame and movable vertically therein, means for raising and lowering the bin comprising shafts at the ends of said frame having drums, pulleys mounted on said frame and on the bin, cables passing around said drums and pulleys whereby by winding up said cables the bin may be elevated, and means for simultaneously rotating said shafts to simultaneously wind or unwind the cables.

4. A loading apparatus, comprising a main frame, a bin supported by said frame and movable vertically therein, means for raising and lowering the bin comprising shafts at the ends of said frame having drums, pulleys mounted on said frame and on the bin, cables passing around said drums and pulleys whereby by winding up said cables the bin may be elevated, means for simultaneously rotating said shafts to simultaneously wind or unwind the cables, and means adjustably connecting the ends of the cables with the frame.

5. A loading apparatus, comprising a main frame, a bin supported by said frame and movable vertically therein, means for raising and lowering the bin comprising shafts at the ends of said frame having drums, pulleys mounted on said frame and on the bin, cables passing around said drums and pulleys whereby by winding up said cables the bin may be elevated, worms, and worm wheels for rotating said shafts for winding or unwinding the cables.

6. A loading apparatus, comprising a box-like frame, a bin telescopically mounted in said frame and vertically movable therein, shafts supported at the ends of said frame, said shafts having drums, means for simultaneously rotating said shafts, pulleys and adjusting bolts at the upper portions of said frame, pulleys at the lower end portions of the bin, and cables connected with said drums and with said adjusting bolts and passing around said pulleys for raising and lowering the bin.

7. A loading apparatus, comprising a frame having upright guide-posts, a bin vertically movable in said frame, means for raising and lowering said frame, and guide rollers at the corners of the bin and engaging side and end faces of said guide-posts.

8. A loading apparatus, comprising a frame having upright guide-posts, a bin vertically movable in said frame, means for raising and lowering said frame, and a pair of angularly-disposed guide rollers at the corners of the bin and engaging said guide-posts, the guide rollers of each pair being arranged to engage adjacent faces of the guide-posts.

SAMUEL FRANK WELCH.

Witnesses:
M. T. BABT,
H. D. HAMPER.